United States Patent
Yang et al.

(10) Patent No.: US 9,294,229 B2
(45) Date of Patent: Mar. 22, 2016

(54) TIME-SLOT BASED MULTIPLE ACK/NACK TRANSMISSION

(75) Inventors: Suck Chel Yang, Anyang-si (KR); Min Gyu Kim, Anyang-si (KR); Joon Kui Ahn, Anyang-si (KR); Dong Youn Seo, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 262 days.

(21) Appl. No.: 13/379,217

(22) PCT Filed: Mar. 16, 2010

(86) PCT No.: PCT/KR2010/001616
§ 371 (c)(1),
(2), (4) Date: Dec. 19, 2011

(87) PCT Pub. No.: WO2011/025111
PCT Pub. Date: Mar. 3, 2011

(65) Prior Publication Data
US 2012/0106491 A1    May 3, 2012

Related U.S. Application Data

(60) Provisional application No. 61/237,283, filed on Aug. 26, 2009, provisional application No. 61/240,293, filed on Sep. 7, 2009.

(30) Foreign Application Priority Data

Feb. 2, 2010   (KR) .................. 10-2010-0009569

(51) Int. Cl.
*H04L 1/00*    (2006.01)
*H04L 5/00*    (2006.01)
*H04L 1/18*    (2006.01)

(52) U.S. Cl.
CPC ............ *H04L 1/0073* (2013.01); *H04L 1/1858* (2013.01); *H04L 1/1861* (2013.01); *H04L 5/006* (2013.01); *H04L 5/0053* (2013.01); *H04L 5/0055* (2013.01)

(58) Field of Classification Search
None
See application file for complete search history.

(56) References Cited

U.S. PATENT DOCUMENTS 6,621,796 B1 *    9/2003  Miklos .................... 370/236
2005/0208945 A1 *    9/2005  Hong et al. ............ 455/436

(Continued)

FOREIGN PATENT DOCUMENTS

KR    10-2009-0017408 A    2/2009
KR    10-2009-0062738 A    6/2009

OTHER PUBLICATIONS

Office Action Response filed Apr. 30, 2013, U.S. Appl. No. 13/148,054, Amended Claims, pp. 2-8.*

(Continued)

*Primary Examiner* — Joshua A Kading
(74) *Attorney, Agent, or Firm* — Birch, Stewart, Kolasch & Birch, LLP

(57) ABSTRACT

A method of transmitting ACK/NACK (Acknowledgement/Negative-ACK) signal by a user equipment in a wireless communication system comprises receiving a plurality of data unit from a base station; reserving a plurality of physical uplink control channel (PUCCH) resources corresponding to the plurality of data units within a subframe having a plurality of slots; and transmitting one or more ACK/NACK signals for the plurality of data units to the base station by using at least part of the plurality of PUCCH resources reserved within the subframe, wherein the PUCCH resources through which the one or more ACK/NACK signals are transmitted are selected independently per slot.

16 Claims, 19 Drawing Sheets

(56) References Cited

U.S. PATENT DOCUMENTS

| | | | |
|---|---|---|---|
| 2008/0095106 A1* | 4/2008 | Malladi et al. | 370/329 |
| 2008/0095109 A1* | 4/2008 | Malladi et al. | 370/330 |
| 2008/0170634 A1 | 7/2008 | Kwak et al. | |
| 2009/0097457 A1* | 4/2009 | Papasakellariou et al. | 370/336 |
| 2009/0203323 A1 | 8/2009 | Ratasuk et al. | |
| 2010/0103902 A1 | 4/2010 | Kim et al. | |
| 2010/0271970 A1* | 10/2010 | Pan et al. | 370/252 |
| 2011/0292902 A1* | 12/2011 | Yang et al. | 370/329 |
| 2013/0016684 A1* | 1/2013 | Attar et al. | 370/329 |
| 2013/0170462 A1* | 7/2013 | Seo et al. | 370/329 |

OTHER PUBLICATIONS

Response After Final (entered by RCE), U.S. Appl. No. 13/148,054, filed Oct. 8, 2013 (entered Oct. 24, 2013), Claims, pp. 1-8.*

* cited by examiner

Single component carrier (e.g. LTE system)

PUCCH format 1a and 1b structure (normal CP case)

FIG. 13A

TIME-SLOT BASED MULTIPLE ACK/NACK TRANSMISSION

This application is the National Phase of PCT/KR2010/001616 filed on Mar. 16, 2010, which claims priority under 35 U.S.C. 119(e) to U.S. Provisional Application Nos. 61/237,283 filed on Aug. 26, 2009 and 61/240,293 filed on Sep. 7, 2009 and under 35 U.S.C. 119(a) to Patent Application No. 10-2010-0009569 filed in Republic of Korea on Feb. 2, 2010, all of which are hereby expressly incorporated by reference into the present application.

DETAILED DESCRIPTION OF THE INVENTION

Technical Field

The present invention relates to a wireless communication system, and more particularly, to a method and apparatus of time-slot based multiple ACK/NACK signal transmission.

BACKGROUND ART

A wireless communication system has been widely developed to provide various kinds of communication services such as voice and data. Generally, the wireless communication system is a multiple access system that can support communication with multiple users by sharing available system resources (bandwidth, transmission power, etc.). Examples of the multiple access system include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multi carrier-frequency division multiple access (MC-FDMA) system.

DESCRIPTION OF THE INVENTION

Technical Problems

Accordingly, the present invention is directed to a method and apparatus of time-slot based multiple ACK/NACK signal transmission, which substantially obviates one or more problems due to limitations and disadvantages of the related art.

An object of the present invention is to provide a method and apparatus of multiple ACK/NACK (Acknowledgement/Negative-ACK) signal transmission in a wireless communication system.

An object of the present invention is to provide a method and apparatus of time-slot based multiple ACK/NACK (Acknowledgement/Negative-ACK) signal transmission in a wireless communication system.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

Technical Solutions

To achieve these objects and other advantages and in accordance with the purpose of the invention, as embodied and broadly described herein, in one aspect of the present invention, a method of transmitting ACK/NACK (Acknowledgement/Negative-ACK) signal by a user equipment in a wireless communication system comprises receiving a plurality of data unit from a base station; reserving a plurality of physical uplink control channel (PUCCH) resources corresponding to the plurality of data units within a subframe having a plurality of slots; and transmitting one or more ACK/NACK signals for the plurality of data units to the base station by using at least part of the plurality of PUCCH resources reserved within the subframe, wherein the PUCCH resources through which the one or more ACK/NACK signals are transmitted are selected independently per slot.

In another aspect of the present invention, a user equipment of a wireless communication system comprises a radio frequency (RF) unit configured to transmit and receive a radio signal to and from a base station; a memory storing information transmitted to and received from the base station and parameters required for an operation of the user equipment; and a processor connected with the RF unit and the memory, controlling the RF unit and the memory for the operation of the user equipment, wherein the processor performs a method of transmitting a signal, the method including receiving a plurality of data unit from a base station; reserving a plurality of physical uplink control channel (PUCCH) resources corresponding to the plurality of data units within a subframe having a plurality of slots; and transmitting one or more ACK/NACK signals for the plurality of data units to the base station by at least part of using the plurality of PUCCH resources reserved within the subframe, wherein the PUCCH resources through which the one or more ACK/NACK signals are transmitted are selected independently per slot.

In this case, the plurality of data units are received at the same time or at different times through the one or more downlink component carriers.

Each ACK/NACK signal for each data unit is transmitted through each slot corresponding to each data unit. In this case, each ACK/NACK signal for each data unit is transmitted using the PUCCH resource corresponding to each data unit.

If ACK/NACK signals multiplexed for the plurality of data units are transmitted, PUCCH resources through which the multiplexed ACK/NACK signals are transmitted are different from one another based on the slot. Also, if ACK/NACK signals multiplexed for the plurality of data units are transmitted, modulation values applied to the multiplexed ACK/NACK signals are different from one another based on the slot.

Advantageous Effects

According to the embodiments of the present invention, it is possible to efficiently transmit ACK/NACK signals in a wireless communication system. In more detail, it is possible to efficiently transmit slot based ACK/NACK signals in a wireless communication system. Also, it is possible to reduce ACK/NACK transmission power while maintaining single carrier features for ACK/NACK signals. Moreover, error handling can be performed easily when a PDCCH error occurs.

It is to be understood that the advantages that can be obtained by the present invention are not limited to the aforementioned advantage and other advantages which are not mentioned will be apparent from the following description to the person with an ordinary skill in the art to which the present invention pertains.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

BEST MODE FOR CARRYING OUT THE INVENTION

Hereinafter, structures, operations, and other features of the present invention will be understood readily by the preferred embodiments of the present invention, examples of which are illustrated in the accompanying drawings. The embodiments of the present invention can be used for various wireless access technologies such as CDMA, FDMA, TDMA, OFDMA, SC-FDMA, and MC-FDMA. The CDMA can be implemented by wireless technology such as universal terrestrial radio access (UTRA) or CDMA2000. The TDMA can be implemented by wireless technology such as global system for mobile communications (GSM)/general packet radio service (GPRS)/enhanced data rates for GSM evolution (EDGE). OFDMA can be implemented by wireless technology such as IEEE 802.11 (Wi-Fi), IEEE 802.16 (WiMAX), IEEE 802.20, and evolved UTRA (E-UTRA). The UTRA is a part of a universal mobile telecommunications system (UMTS). A $3^{rd}$ generation partnership project long term evolution (3GPP LTE) communication system is a part of an evolved UMTS (E-UMTS) that uses E-UTRA. LTE-advanced (LTE-A) is an evolved version of the 3GPP LTE.

The following embodiments will be described based on that technical features of the present invention are applied to the 3GPP system. However, it is to be understood that the 3GPP system is only exemplary and the present invention is not limited to the 3GPP system.

Figure 1:
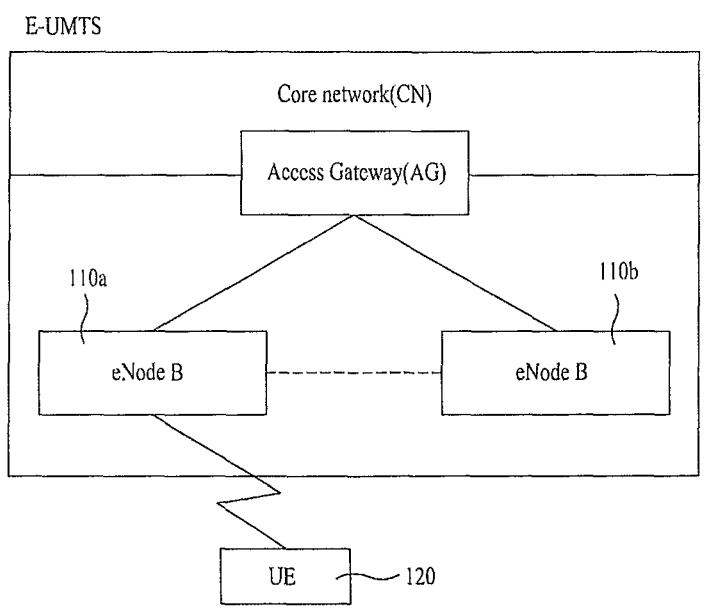
FIG. 1 is a diagram illustrating a network structure of an Evolved Universal Mobile Telecommunications System (E-UMTS)

FIG. 1 is a diagram illustrating a network structure of an Evolved Universal Mobile Telecommunications System (E-UMTS). The E-UMTS may be referred to as a Long Term Evolution (LTE) system. For details of the technical specifications of the UMTS and E-UMTS, refer to Release 7 and Release 8 of "3rd Generation Partnership Project; Technical Specification Group Radio Access Network".

Referring to FIG. 1, the E-UMTS includes a User Equipment (UE) 120, base stations (eNode B and eNB) 110a and 110b, and an Access Gateway (AG) which is located at an end of a network (E-UTRAN) and connected to an external network. Generally, the base stations can simultaneously transmit multiple data streams for a broadcast service, a multicast service and/or a unicast service. One or more cells may exist for one base station. One cell is set to one of bandwidths of 1.25, 2.5, 5, 10, and 20 Mhz. Different cells may be set to provide different bandwidths. Also, one base station controls data transmission and reception for a plurality of user equipments. The base station transmits downlink (DL) scheduling information of downlink data to a corresponding user equipment to notify the corresponding user equipment of time and frequency domains to which data will be transmitted and information related to encoding, data size, hybrid automatic repeat and request (HARQ). Also, the base station transmits uplink (UL) scheduling information of uplink data to the corresponding user equipment to notify the corresponding user equipment of time and frequency domains that can be used by the corresponding user equipment, and information related to encoding, data size, HARQ. A Core Network (CN) may include the AG and a network node for user registration of the UE. The AG manages mobility of a UE on a Tracking Area (TA) basis, wherein one TA includes a plurality of cells.

Figure 2:
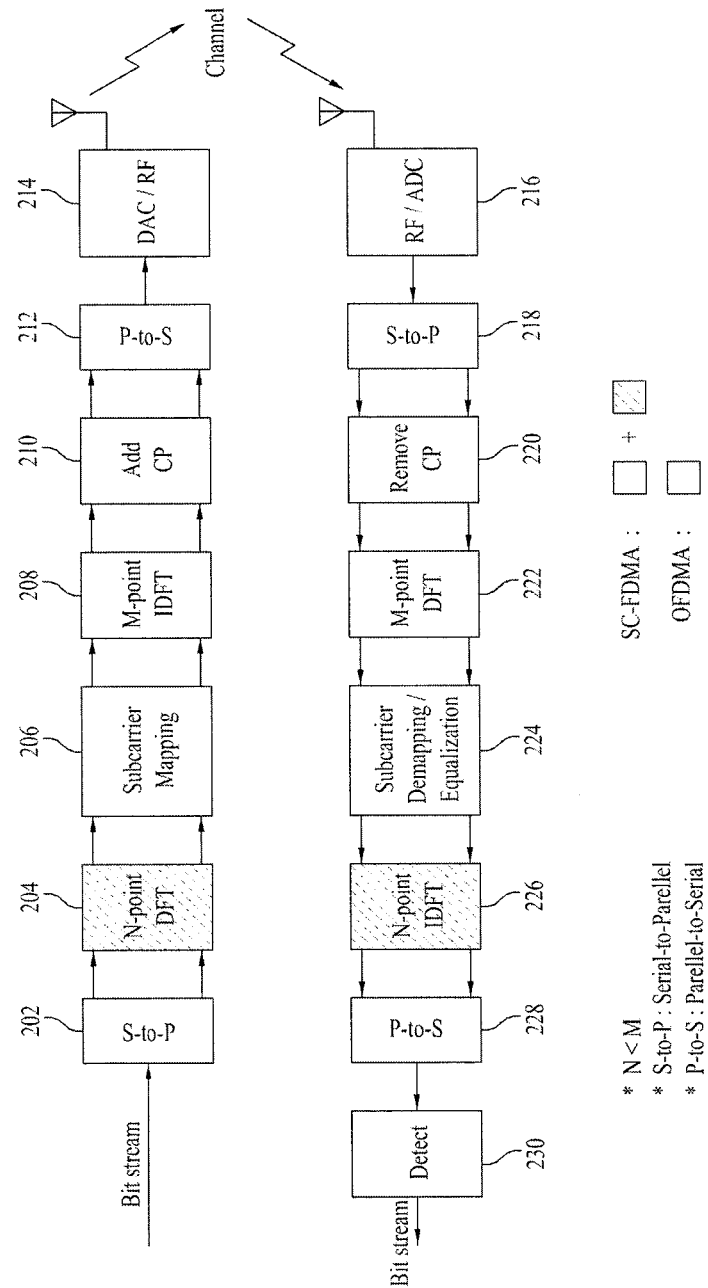
FIG. 2 is a block diagram illustrating a transmitter and a receiver for OFDMA and SC-FDMA.

FIG. 2 is a block diagram illustrating a transmitter and a receiver for OFDMA and SC-FDMA. In the uplink, transmitters 202 to 214 are parts of the user equipment, and receivers 216 to 230 are parts of the base station. In the downlink, the transmitters are parts of the base station, and the receivers are parts of the user equipment.

Referring to FIG. 2, an OFDMA transmitter includes a serial to parallel converter 202, a sub-carrier mapping module 206, an M-point inverse discrete fourier transform (IDFT) module 208, a cyclic prefix (CP) addition module 210, a parallel to serial converter 212, and a radio frequency (RF)/digital to analog converter (DAC) module 214.

A signal processing procedure in the OFDMA transmitter will be described below. First of all, bit streams are modulated to data symbol sequences. The bit streams can be obtained by performing various signal processes, such as channel encoding, interleaving and scrambling, for a data block transferred from the MAC layer. The bit streams may be designated as codewords, and are equivalent to the data block transferred from the MAC layer. The data block transferred from the MAC layer may be designated as a transmission block. Examples of a modulation scheme include, but not limited to, EPSK (binary phase shift keying), QPSK (quadrature phase shift keying), and n-QAM (quadrature amplitude modulation). The data symbol sequences in series are converted to parallel data symbol sequences as much as N (202). N number of data symbols are mapped with N number of subcarriers allocated among a total of M number of subcarriers, and the other M-N number of carriers are padded with 0 (206). The data symbols mapped in a frequency domain are converted to time domain sequences through M-point IDFT processing (208). Afterwards, in order to reduce inter-symbol interference (ISI) and inter-carrier interference (ICI), cyclic prefix is added to the time domain sequences to generate OFDMA symbols (210). The generated OFDMA symbols are converted from parallel symbols to serial symbols (212). Then, the OFDMA symbols are transmitted to the receiver through digital-to-analog conversion and frequency uplink conversion (214). Other user is allocated with available subcarriers among the remaining M-N number of subcarriers. The OFDMA receiver includes an RF/ADC (analog to digital converter) module 216, a serial-to-parallel converter 218, a cyclic prefix removing module 220, a discrete fourier transform (DFT) module 222, a subcarrier demapping/equalization module 224, a parallel-to-digital converter 228, and a detection module 230. A signal processing procedure of the OFDMA receiver will be configured in reverse order of the OFDMA transmitter.

As compared with the OFDMA transmitter, the SC-FDMA transmitter additionally includes an N-point DFT module 204 prior to the subcarrier mapping module 206. The SC-FDMA transmitter can reduce a peak-to-average power ratio (PAPR) of a transmitting signal more remarkably than the OFDMA transmitter by spreading a plurality of data to the frequency domain through DFT prior to IDFT processing. Also, as compared with the OFDMA receiver, the SC-FDMA receiver additionally includes an N-point IDFT module 226 after the subcarrier demapping module 224. A signal processing procedure of the SC-FDMA receiver will be configured in reverse order of the SC-FDMA transmitter.

Figure 3:
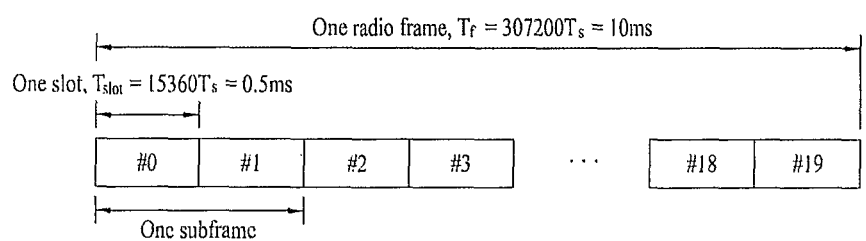
FIG. 3 is a diagram illustrating a structure of a radio frame used in an LTE system.

FIG. 3 is a diagram illustrating a structure of a radio frame used in the LTE system.

Referring to FIG. 3, the radio frame has a length of 10 ms($327200 \cdot T_s$) and includes 10 subframes of an equal size. Each sub frame has a length of 1 ms and includes two slots. Each slot has a length of 0.5 ms($15360 \cdot T_s$). In this case, $T_s$ represents a sampling time, and is expressed by $T_s=1/(15 kHz \times 2048)=3.2552 \times 10^{-8}$(about 33 ns). The slot includes a plurality of OFDMA (or SC-FDMA) symbols in a time domain, and includes a plurality of resource blocks (RBs) in a frequency domain. In the LTE system, one resource block includes twelve (12) subcarriers×seven (or six) OFDMA (or SC-FDMA) symbols. A transmission time interval (TTI) which is a transmission unit time of data can be determined in a unit of one or more subframes. The aforementioned structure of the radio frame is only exemplary, and various modifications can be made in the number of subframes included in the radio frame or the number of slots included in the subframe, or the number of OFDMA (or SC-FDMA) symbols included in the slot.

Figure 4:
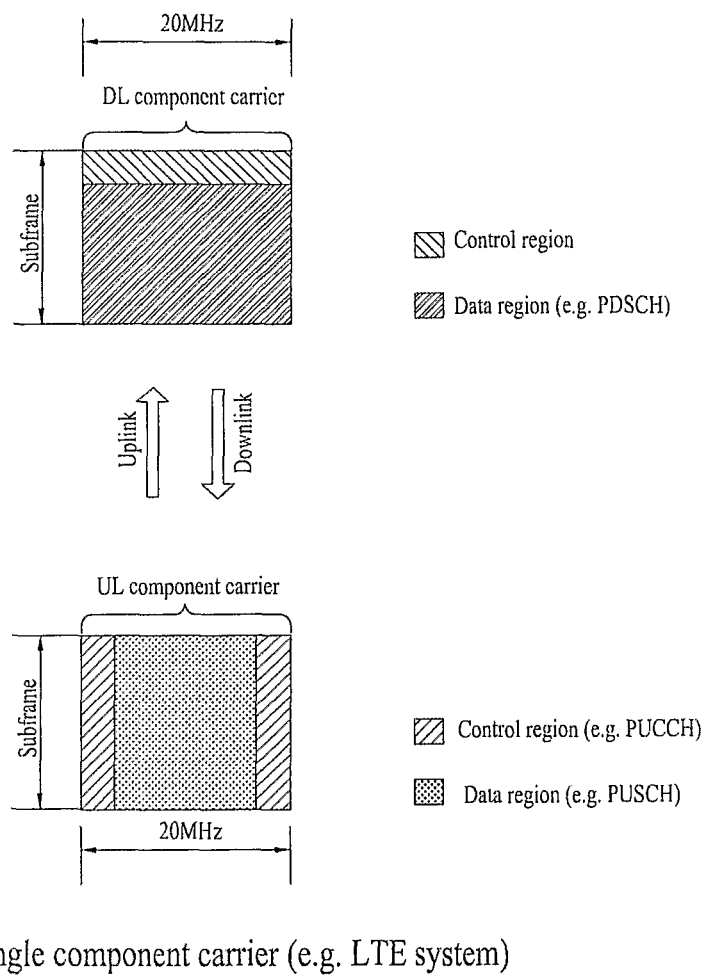
FIG. 4 is a diagram illustrating an example of communication performed under a single component carrier.

FIG. 4 is a diagram illustrating an example of communication performed under a single component carrier. FIG. 4 corresponds to a communication example of the LTE system. In the FDD mode, data transmission and reception is performed through one downlink band and one uplink band corresponding to the downlink band. In more detail, in the FDD mode, the radio frame structure of FIG. 3 is used for downlink transmission or uplink transmission only. On the other hand, in the TDD mode, the same frequency band is divided into a downlink interval and an uplink interval corresponding to the downlink interval in the time domain. In more detail, in the TDD mode, the radio frame structure of FIG. 3 is divided for downlink transmission and uplink transmission corresponding to the downlink transmission.

A method for performing HARQ (Hybrid Automatic Repeat and request) in a user equipment will be described with reference to FIG. 4. In the LTE system, control information (for example, scheduling information) of downlink data transmission of the base station is transferred to the user equipment through a downlink control channel established within a control region of a downlink subframe. The downlink control channel includes a physical downlink control channel (PDSCH). The user equipment can receive scheduled data through a downlink common channel indicated by scheduling information after receiving scheduling information (for example, resources allocated with data, size of data, coding mode, redundancy version, etc.) through the control channel. The downlink common channel includes a physical uplink channel (PDSCH). Afterwards, the user equipment can transmit acknowledgement information (for example, HARQ ACK/NACK) in response to downlink data to the base station through the uplink control channel established within the control region of the uplink subframe. The uplink control channel includes a physical uplink control channel (PUCCH). For convenience, HARQ ACK/NACK will simply be expressed as ACK/NACK. The base station performs HARQ for downlink data indicated as NACK after receiving ACK/NACK. If the base station transmits a plurality of downlink data to the user equipment, the HARQ process can be performed for each transport block corresponding to each of the downlink data.

Figure 5A:
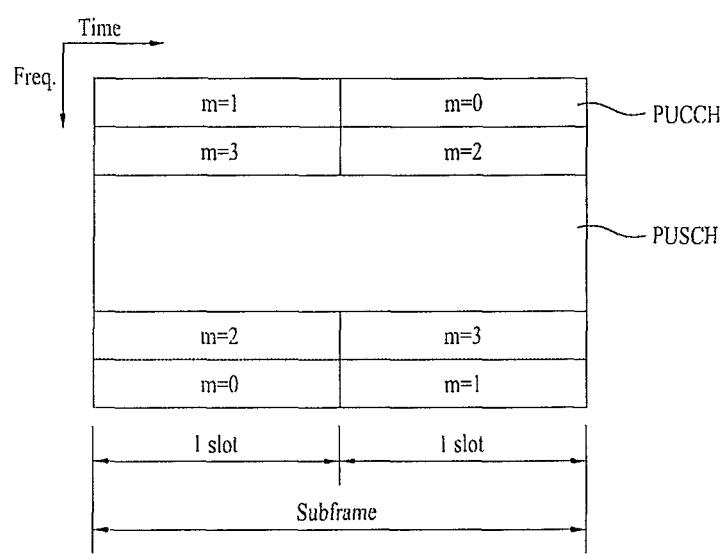
FIG. 5A is a diagram illustrating a structure of an uplink subframe used in an LTE system.

FIG. 5A is a diagram illustrating a structure of an uplink subframe used in an LTE system.

Referring to FIG. 5A, the uplink subframe includes a plurality of slots (for example, two slots). The slot can include a different number of SC-FDMA symbols depending on a CP length. For example, in case of a normal CP, the slot includes seven SC-FDMA symbols. The uplink subframe is divided into a data region and a control region. The data region includes a physical uplink shared channel (PUSCH), and is used to transmit a data signal such as voice. The control region includes a physical uplink control channel (PUCCH), and is used to transmit control information. The PUCCH includes a pair of resource blocks (RBS) (for example, m=0, 1,2,3) located at both ends of the data region on the frequency axis, and is hopped using the slot as a boundary. The control information includes HARQ ACK/NACK, channel quality indicator (CQI), precoding matrix index (PMI), and rank index (RI).

Figure 5B:
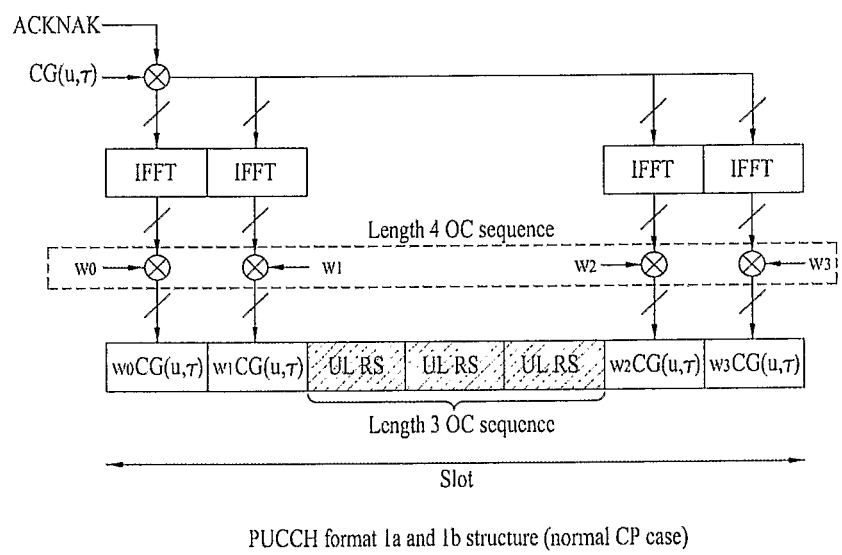
FIG. 5B is a diagram illustrating a structure of an uplink control channel used in an LTE system.

FIG. 5B is a diagram illustrating a structure of a physical uplink control channel (PUCCH) for transmitting ACK/NACK.

Referring to FIG. 5B, in case of a normal cyclic prefix (CP), a reference signal (UL RS) is carried in three continuous symbols located in the center of the slot, and control information (i.e., ACK/NACK signals) is carried in the other four symbols. In case of an extended CP, the slot includes six symbols, wherein a reference signal is carried in the third and fourth symbols. ACK/NACK signals from a plurality of user equipments are multiplexed with one PUCCH resource by using a CDM mode. The CDM mode is implemented using cyclic shift (CS) of frequency spreading and/or (quasi) orthogonal spreading codes for time spreading. For example, ACK/NACK are identified using different cyclic shifts (CS) of computer generated constant amplitude zero auto correlation (CG-CAZAC) sequence (frequency spreading) and/or different walsh/DFT orthogonal codes (time spreading). w0, w1, w2, w3 multiplied after IFFT obtain the same result even though they are multiplied before IFFT. In the LTE system, PUCCH resources for transmitting ACK/NACK are expressed by combination of frequency-time resources (for example, resource block), cyclic shift of sequences for frequency spreading, and (quasi)orthogonal codes for time spreading. Each PUCCH resource is indicated using a PUCCH (resource) index.

Figure 6:
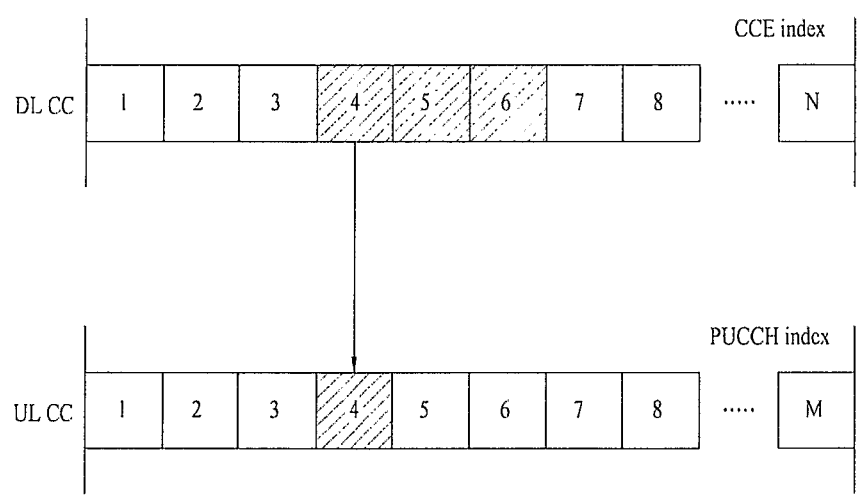
FIG. 6 is a diagram illustrating a correspondence relation between PUCCH and PDCCH for ACK/NACK transmission.

FIG. 6 is a diagram illustrating an example of determining PUCCH resources for ACK/NACK. In the LTE system, PUCCH resources for ACK/NACK are not previously allocated to each user equipment but shared by a plurality of user equipments within a cell per timing point. In more detail, the PUCCH resources used for ACK/NACK transmission correspond to PDCCH carrying scheduling information of corresponding downlink data. In each downlink subframe, an entire region where PDCCH(s) is transmitted includes a plurality of control channel elements (CCEs), and the PDCCH transmitted to the user equipment includes one or more CCEs. The user equipment transmits ACK/NACK through a PUCCH resource corresponding to a specific CCE (for example, first CCE) among CCEs constituting PDCCH received therein.

Referring to FIG. 6, each square block in a downlink component carrier (DL CC) represents a CCE, and each square block in an uplink component carrier (UL CC) represents a PUCCH resource. Each PUCCH index corresponds to a PUCCH resource for ACK/NACK. It is assumed that information regarding PDCCH information is transferred through a PDCCH that includes CCEs Nos. 4 to 6 as illustrated in FIG. 6. In this case, the user equipment transmits ACK/NACK through PUCCH No. 4 corresponding to CCE No. 4 which is the first CCE of the PDCCH. FIG. 6 illustrates that maximum M number of PUCCHs exist in the UL CC when maximum N number of CCEs exist in the DL CC. Although N may be equal to M (N=M), M may be different from N, and mapping between CCEs and PUCCHs may be overlapped.

In more detail, in the LTE system, PUCCH resource index is defined as follows.

$$n^{(1)}_{PUCCH} = n_{CCE} + N^{(1)}_{PUCCH} \qquad \text{[Equation 1]}$$

In this case, $n^{(1)}_{PUCCH}$ represents a PUCCH resource index for transmitting ACK/NACK, $N^{(1)}_{PUCCH}$ represents a signaling value transferred from an upper layer, and $n_{CCE}$ represents the smallest value of CCE indexes used for PDCCH transmission.

If the LTE system is operated in accordance with the TDD mode, the user equipment transmits one multiplexed ACK/NACK signal for a plurality of PDSCHs received through subframes of different timing points. In more detail, the user equipment transmits one multiplexed ACK/NACK signal for a plurality of PDSCHs by using a PUCCH selection transmission mode. In the PUCCH selection transmission mode, the user equipment reserves a plurality of uplink physical channels to transmit the multiplexed ACK/NACK signal if it receives a plurality of downlink data. For example, if the user equipment receives a plurality of PDSCHs, the user equipment can reserve the same number of PUCCHs as the PDSCHs by using a specific CCE of each PDCCH that indicates each PDCCH. In this case, the user equipment can transmit the multiplexed ACK/NACK signal by using combination of a PUCCH selected from the plurality of the reserved PUCCHs and modulation/coding applied to the selected PUCCH.

Table 1 illustrates the PUCCH selection transmission mode defined in the LTE system.

TABLE 1

| ACK(0), ACK(1), ACK(2), ACK(3) | Subframe $n^{(1)}_{PUCCH,X}$ | b(0), b(1) |
|---|---|---|
| ACK, ACK, ACK, ACK | $n^{(1)}_{PUCCH,1}$ | 1, 1 |
| ACK, ACK, ACK, NACK/DTX | $n^{(1)}_{PUCCH,1}$ | 1, 0 |
| NACK/DTX, NACK/DTX, NACK, DTX | $n^{(1)}_{PUCCH,2}$ | 1, 1 |
| ACK, ACK, NACK/DTX, ACK | $n^{(1)}_{PUCCH,1}$ | 1, 0 |
| NACK, DTX, DTX, DTX | $n^{(1)}_{PUCCH,0}$ | 1, 0 |
| ACK, ACK, NACK/DTX, NACK/DTX | $n^{(1)}_{PUCCH,1}$ | 1, 0 |
| ACK, NACK/DTX, ACK, ACK | $n^{(1)}_{PUCCH,3}$ | 0, 1 |
| NACK/DTX, NACK/DTX, NACK/DTX, NACK | $n^{(1)}_{PUCCH,3}$ | 1, 1 |
| ACK, NACK/DTX, ACK, NACK/DTX | $n^{(1)}_{PUCCH,2}$ | 0, 1 |
| ACK, NACK/DTX, NACK/DTX, ACK | $n^{(1)}_{PUCCH,0}$ | 0, 1 |
| ACK, NACK/DTX, NACK/DTX, NACK/DTX | $n^{(1)}_{PUCCH,0}$ | 1, 1 |
| NACK/DTX, ACK, ACK, ACK | $n^{(1)}_{PUCCH,3}$ | 0, 1 |
| NACK/DTX, NACK, DTX, DTX | $n^{(1)}_{PUCCH,1}$ | 0, 0 |
| NACK/DTX, ACK, ACK, NACK/DTX | $n^{(1)}_{PUCCH,2}$ | 1, 0 |
| NACK/DTX, ACK, NACK/DTX, ACK | $n^{(1)}_{PUCCH,3}$ | 1, 0 |
| NACK/DTX, ACK, NACK/DTX, NACK/DTX | $n^{(1)}_{PUCCH,1}$ | 0, 1 |
| NACK/DTX, NACK/DTX, ACK, ACK | $n^{(1)}_{PUCCH,3}$ | 0, 1 |
| NACK/DTX, NACK/DTX, ACK, NACK/DTX | $n^{(1)}_{PUCCH,2}$ | 0, 0 |
| NACK/DTX, NACK/DTX, NACK/DTX, ACK | $n^{(1)}_{PUCCH,3}$ | 0, 0 |
| DTX, DTX, DTX, DTX | N/A | N/A |

In Table 1, ACK(i) represents HARQ ACK/NACK result of the i-th data unit (0≤i≤3). DTX (Discontinuous Transmission) represents that transmission of a data unit corresponding to ACK(i) is not performed or the user equipment fails to detect a data unit corresponding to HARQ-ACK(i). In respect of each data unit, maximum four PUCCH resources (i.e., $n^{(1)}_{PUCCH,0} \sim n^{(1)}_{PUCCH,3}$) can be reserved. The multiplexed ACK/NACK is transmitted through one PUCCH resource selected from the reserved PUCCH resources. $n^{(1)}_{PUCCH,X}$ listed in Table 1 represents a PUCCH resource used to actually transmit ACK/NACK. b(0)b(1) represents two bits transmitted through the selected PUCCH resource, and is modulated in accordance with QPSK mode. For example, if the user equipment successfully decodes four data units, it transmits (1,1) to the base station through the PUCCH resource connected with $n^{(1)}_{PUCCH,1}$. Since combination of PUCCH resource and QPSK symbol is insufficient to represent possible ACK/NACK hypotheses, NACK is coupled to DTX except for some cases (NACK/DTX; N/D).

Figure 7:
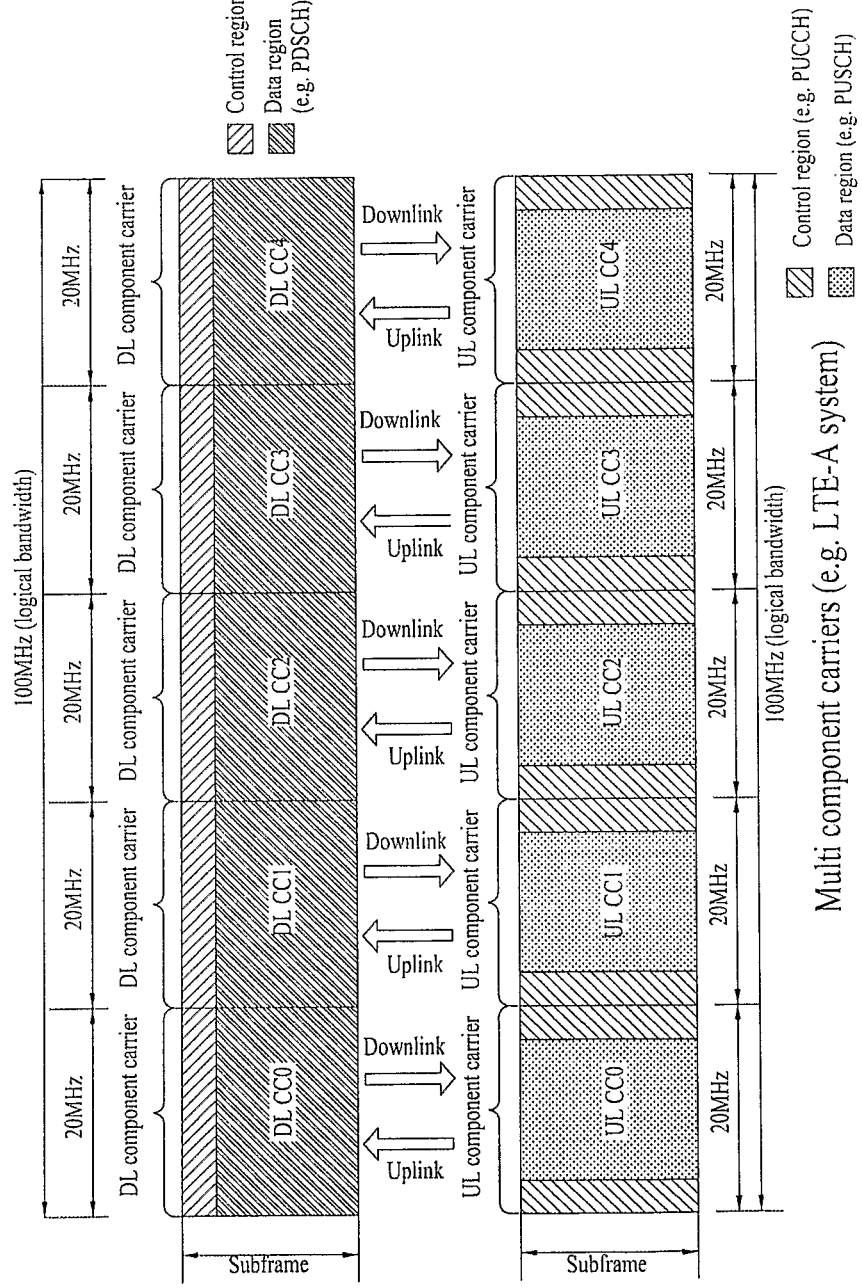
FIG. 7 is a diagram illustrating an example of communication performed under a multi-component carrier.

FIG. 7 is a diagram illustrating an example of communication performed under multiple component carriers. FIG. 7 corresponds to a communication example of the LTE-A system. The LTE-A system uses carrier aggregation or bandwidth aggregation where a plurality of uplink/downlink frequency blocks are collected to use broader frequency bandwidths, thereby using greater uplink/downlink bandwidths. Each frequency block is transmitted using a component carrier (CC). The CC may mean a frequency block for carrier aggregation or a center carrier of a frequency block depending on the context, wherein the frequency block and the center carrier are used together.

Referring to FIG. 7, five component carriers (CCs) of 20 MHz are collected in the uplink/downlink to support a bandwidth of 100 MHz. The respective CCs may be contiguous each other in the frequency domain or not. The radio frame structure illustrated in FIG. 3 can be also applied in the case that multiple component carriers are used. However, since radio frame, subframe and slot are defined in a time unit, the base station and the user equipment can transmit and receive a signal through a plurality of component carriers on one subframe. FIG. 7 illustrates that a bandwidth of each UL CC is the same as and symmetrical to that of each DL CC. However, the bandwidths of the respective component carriers may be defined independently. For example, the bandwidths of the UL CCs may be configured as 5 MHz (UL CC0)+20 MHz (UL CC1)+20 MHz (UL CC2)+20 MHz (UL CC3)+5 MHz (UL CC4). Also, asymmetrical carrier aggregation where the number of uplink component carriers is different from the number of downlink component carriers may be configured. The asymmetrical carrier aggregation may occur due to a limit of available frequency bandwidth, or may be configured artificially by network establishment. Also, although an uplink signal and a downlink signal are illustrated to be transmitted through CCs mapped with each other one to one, CC through which a signal is actually transmitted may be varied depending on network establishment or signal type. For example, CC through which scheduling command is transmitted may be different from CC through which data are transmitted in accordance with scheduling command. Also, uplink/downlink control information can be transmitted through a specific UL/DL CC regardless of mapping between CCs.

Meanwhile, even though N number of CCs are configured in the entire system band, a frequency band that can be used by a user equipment can be limited to M(<N) number of CCs. Various parameters of carrier aggregation can be set in accordance with a cell-specific scheme, a UE group-specific scheme, or a UE-specific scheme. Accordingly, when N number of CCs exists within a cell, although the user equipment could receive PDSCH through all the CCs, the base station may limit CCs through which PDSCH(s) is received by the user equipment, to M(M<N) in accordance with a semi-static manner. Hereinafter, although the embodiments of the present invention are applied to N number of CCs, it will be apparent that the embodiments of the present invention may be applied to M number of CCs. Also, N (or M) number of CCs allocated to the user equipment may be divided into L number of CC groups. In this case, the embodiments of the present invention may be applied to each CC group.

If the number of UL CCs is, but not limited to, smaller than the number of DL CCs, the user equipment should transmit ACK/NACK for transmission of a plurality of downlink PDSCHs through smaller uplink PUCCHs. In particular, it may be set in such a manner that ACK/NACK for transmission of a plurality of downlink PDSCHs is transmitted through a specific UL CC (group) (for example, anchor UL CC (group)) only. Also, if the number of UL CCs is the same as the number of DL CCs and the user equipment uses MIMO (Multiple Input Multiple Output) or is operated in accordance with the TDD mode, the user equipment receives a plurality of data units (for example, redundancy version of codeword). In this case, the user equipment should transmit ACK/NACK signal for a plurality of data units through the limited PUCCH resource.

Meanwhile, in the LTE system according to the related art, PUCCH resources are repeated within a subframe in a slot unit, and ACK/NACK signals having the same value are transmitted through each slot. Repetition of the PUCCH resources defined in the LTE system is to enhance reliability of ACK/NACK signals through time/frequency diversity. However, information of ACK/NACK signals that can be transmitted at once is reduced in proportion to the number of repetition times of the PUCCH resources.

Accordingly, the present invention suggests that PUCCH resources for transmitting ACK/NACK signal are defined in a slot unit instead of a subframe unit. Namely, PUCCH resources repeated within a subframe in a slot unit can be used independently during ACK/NACK signal transmission. In other words, the PUCCH resources repeated within a subframe in a slot unit are subjected to decoupling during ACK/NACK signal transmission. Accordingly, the PUCCH resources repeated within a subframe in a slot unit can be selected independently based on the slot. Meanwhile, control information (for example, CQI, PMI, RI, RS) other than ACK/NACK can be repeated within a subframe in a slot unit like the LTE system according to the related art. Performance degradation due to use of PUCCH resources in a slot unit can be solved using a multiple input multiple output (MIMO) transmission scheme such as transmit diversity (TxD). Examples of the MIMO scheme include STBC(Space-Time Block Coding), STBC(Space-Time Block Coding), SFBC (Space-Frequency Block Coding), FSTD (Frequency Switching Transmit Diversity), CDD (Cyclic Delay Diversity).

For convenience, PUCCH transmission in a subframe unit like the LTE system according to the related art will be referred to as per-subframe PUCCH transmission. Also, PUCCH transmission in a slot unit as suggested in the present invention will be referred to as per-slot PUCCH transmission. Moreover, a signal indicating ACK/NACK result of one data unit will be referred to as individual ACK/NACK signal. Also, a signal indicating ACK/NACK result of a plurality of data units will be referred to as a multiplexed ACK/NACK signal. For example, the multiplexed ACK/NACK signal can be generated using the PUCCH selection transmission mode. Meanwhile, the present invention can be applied to a single-carrier transmission mode or a transmission power limit mode. Also, the present invention can provide a hybrid type of per-subframe PUCCH transmission and per-slot PUCCH transmission depending on network establishment or ACK/NACK signal transmission.

Figure 8:
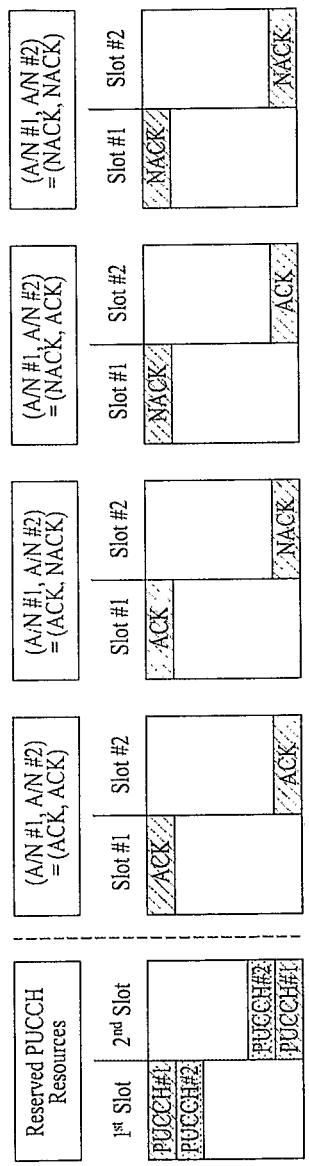
FIG. 8 to FIG. 10 are diagrams illustrating examples of transmitting ACK/NACK signals through per-slot PUCCH transmission in accordance with one embodiment of the present invention.

FIG. 8 is a diagram illustrating an example of ACK/NACK signal transmission in accordance with one embodiment of the present invention. The user equipment can reserve PUCCH resources corresponding to each data unit if it receives a plurality of data units. The PUCCH resources corresponding to each data unit can be reserved by the same RB in the same CC. Also, the PUCCH resources corresponding to each data unit can be reserved by different RBs in same or different CCs. In this embodiment, it is assumed that ACK/NACK signals of a plurality of data units are all mapped with one of the reserved PUCCH resources. The PUCCH resources mapped with ACK/NACK signals can previously be defined or signaled. For example, the PUCCH resources mapped with ACK/NACK signals can previously be defined as a specific (for example, first or last) PUCCH resource by using cell identifier, user equipment identifier, CC identifier, etc. Also, the PUCCH resources mapped with ACK/NACK signals can indicated by UE-specific or UE group-specific manner by using radio resource control (RRC) signaling. Also, the PUCCH resources mapped with ACK/NACK signals can be indicated in a cell-specific manner through a broadcast channel.

Referring to FIG. 8, it is assumed that the user equipment should transmit two ACK/NACK signals and has two PUCCH resources. The PUCCH resources can be reserved by being connected to a data unit (for example, PDSCH) or a control channel (for example, PDCCH) that schedules the data unit. Also, it is assumed that PUCCH resource carrying ACK/NACK signals is previously defined as PUCCH#1. In this case, two individual ACK/NACK signals are all mapped with PUCCH #1, but first and second individual ACK/NACK signals (A/N#1 and A/N#2) are transmitted through first and second slots, respectively. Accordingly, this embodiment can maintain single-carrier features of the ACK/NACK signals and also reduce the total ACK/NACK transmission power.

Meanwhile, the method illustrated in FIG. 8 can cause ACK/NACK error if a PDCCH error occurs. The PDCCH error includes a case where the user equipment fails to detect PDCCH that schedules a data unit or decode PDCCH. For example, if PUCCH#2 resource is not available due to loss of the second PDCCH in FIG. 8, the user equipment can use two methods. According to the first method, the user equipment can transmit individual ACK/NACK signal corresponding to the first data unit to the first slot only. According to the second method, the user equipment can repeatedly transmit one ACK/NACK signal corresponding to the first data unit through two slots. Namely, if the user equipment receives one data unit only, it can perform per-slot PUCCH transmission or per-subframe PUCCH transmission depending on establishment.

However, if the user equipment performs per-subframe PUCCH transmission by using PUCCH#1, the base station can misunderstand the result of acknowledgement of the second data unit as NACK=>ACK (NACK-to-ACK). Since NACK=>ACK error in the physical layer causes retransmission in the upper layer, i.e., radio link control (RLC) layer, considerable transmission delay can be caused. Also, if per-slot PUCCH transmission or per-subframe PUCCH transmission is selectively performed using the same PUCCH resource, threshold detection for identifying one ACK/NACK signal on two slot PUCCHs from two ACK/NACK signals on two slot PUCCHs may be more complicated, whereby ACK/NACK decoding complexity of the receiver may increase. In particular, if the PUCCH#1 resource is not reserved due to loss of the first PDCCH, the ACK/NACK signal is transmitted through another PUCCH resource (i.e., PUCCH#2) different from that predicted by the base station. Accordingly, error may occur during ACK/NACK decision regardless of PUCCH transmission mode. Also, HARQ process may be operated in error due to ACK/NACK signal collision between the user equipments, whereby a problem may occur in scheduling of the base station.

Figure 9:
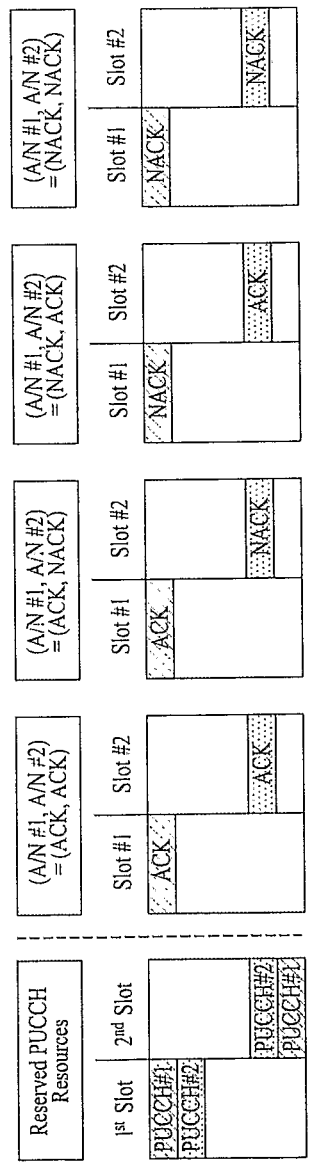

FIG. 9 and FIG. 10 illustrate examples of ACK/NACK signal transmission according to another embodiment of the present invention. In this embodiment, it is assumed that individual ACK/NACK signals for each data unit are mapped with their reserved PUCCH resources and transmitted through different slots. For example, it is assumed that the user equipment should transmit two ACK/NACK signals and has two reserved PUCCH resources. In this case, the first and second individual ACK/NACK signals can be transmitted through the first PUCCH resource of the first slot and the second PUCCH resource of the second slot, respectively. Mapping between PUCCH resource and slot index can be defined previously or signaled by the base station.

Referring to FIG. 9, it is assumed that the user equipment should transmit two ACK/NACK signals and has two PUCCH resources (PUCCH#1 and PUCCH#2). The PUCCH resources can be reserved by being connected to a data unit (for example, PDSCH) or a control channel (for example, PDCCH) that schedules the data unit. In this case, the first and second individual ACK/NACK signals (A/N#1 and A/N#2) are mapped with the first and the second PUCCH resources (PUCCH#1 and PUCCH#2), respectively. Also, A/N#1 on the PUCCH#1 and A/N#2 on the PUCCH#2 are transmitted through the first and second slots, respectively. Accordingly, this embodiment can maintain single-carrier features of the ACK/NACK signals and also reduce the total ACK/NACK transmission power.

Figure 10A:
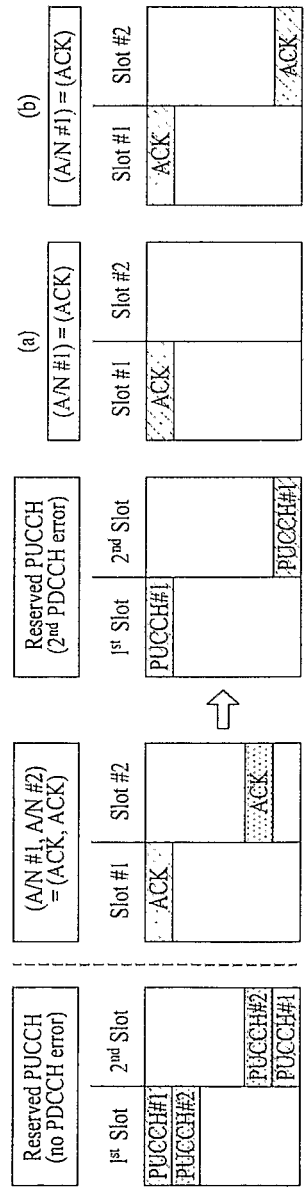
Figure 10B:
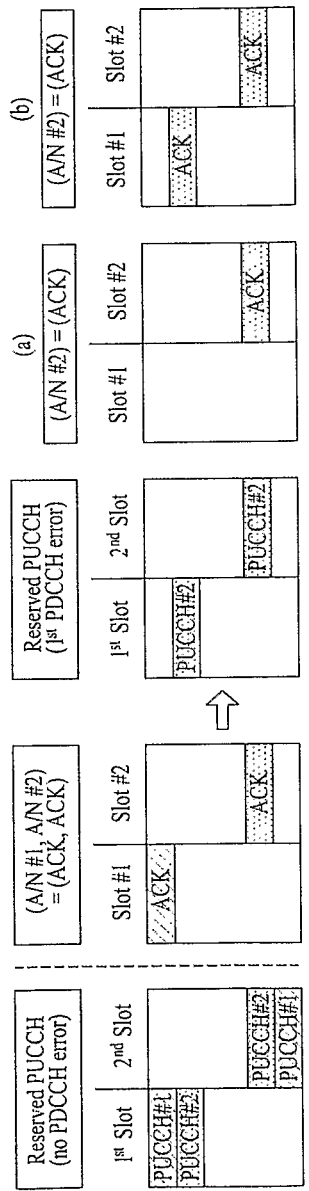

FIG. 10A and FIG. 10B illustrate that PDCCH error corresponding to the first and second data units occurs. In this embodiment, the PDCCH error can be handled more easily. Referring to FIG. 10A and FIG. 10B, the user equipment can consider two methods regardless of the presence of the first or second PUCCH resource due to PDCCH error. According to the first method, the user equipment can transmit individual ACK/NACK signal only corresponding to the data unit scheduled by PDCCH which is successfully decoded, through a corresponding slot. According to the second method, the user equipment can transmit individual ACK/NACK signal corresponding to the data unit scheduled by PDCCH which is successfully decoded, through two slots. Unlike FIG. 9, since the individual ACK/NACK signals for each data unit are transmitted through the PUCCH resources reserved for each data unit, even if one individual ACK/NACK signal is transmitted through two slots, NACK=>ACK error can be reduced. Also, since PUCCH resource carrying ACK/NACK signals is neither defined separately nor signaled, scheduling of the base station and HARQ process are performed without any problem, and additional overhead does not occur.

FIG. 11 to FIG. 14 are diagrams illustrating examples of transmitting multiplexed ACK/NACK signals for a plurality of data units in accordance with one embodiment of the present invention. For example, the multiplexed ACK/NACK signals can be transmitted using the PUCCH selection transmission mode. For convenience, in FIG. 11 to FIG. 14, it is assumed that four ACK/NACK signals should be transmitted by the user equipment. However, this is only exemplary, and smaller or larger number of ACK/NACK signals may be transmitted by the user equipment.

Hereinafter, a transmission mode of multiplexed ACK/NACK signals subject to combination of radio resource/modulation values in a subframe unit like the LTE system according to the related art will be referred to as a per-subframe PUCCH selection transmission mode. Also, transmission mode of multiplexed ACK/NACK signals subject to radio resource/modulation values in a slot unit as suggested in the present invention will be referred to as a per-slot PUCCH selection transmission mode. The results of a plurality of ACK/NACK signals in the per-slot PUCCH selection transmission mode are multiplexed in such a manner that PUCCH resources and/or modulation values are selected in a slot unit. The per-subframe PUCCH selection transmission mode and the per-slot PUCCH selection transmission mode can be implemented in a hybrid type. For example, since combination of PUCCH resources and QPSK modulation values is not sufficient in the LTE system according to the related art, some ACK/NACK hypotheses are overlappingly mapped with the same PUCCH resource and the same modulation value as illustrated in Table 1. Accordingly, the per-slot PUCCH selection transmission mode can be applied to the overlappingly mapped ACK/NACK hypotheses only. Examples of the modulation scheme include phase modulation scheme (for example, n-PSK), phase and amplitude modulation scheme (for example, n-QAM), etc., wherein n is a positive integer (for example, 4, 8, 16).

Figure 11A:
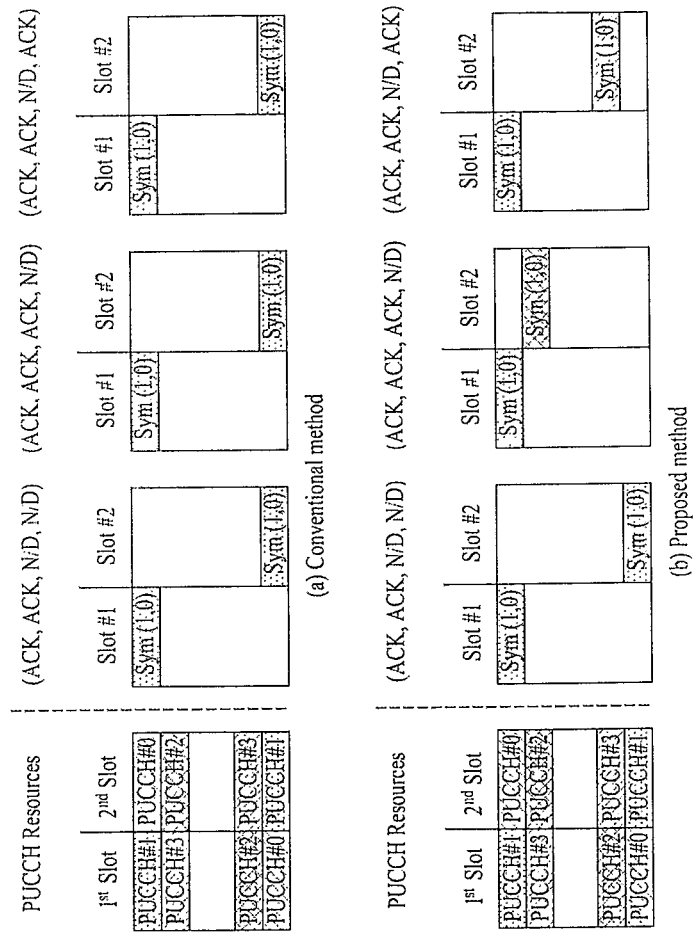
FIG. 11 to FIG. 13 are diagrams illustrating examples of transmitting multiplexed ACK/NACK signals through per-slot PUCCH transmission in accordance with one embodiment of the present invention.
Figure 11B:
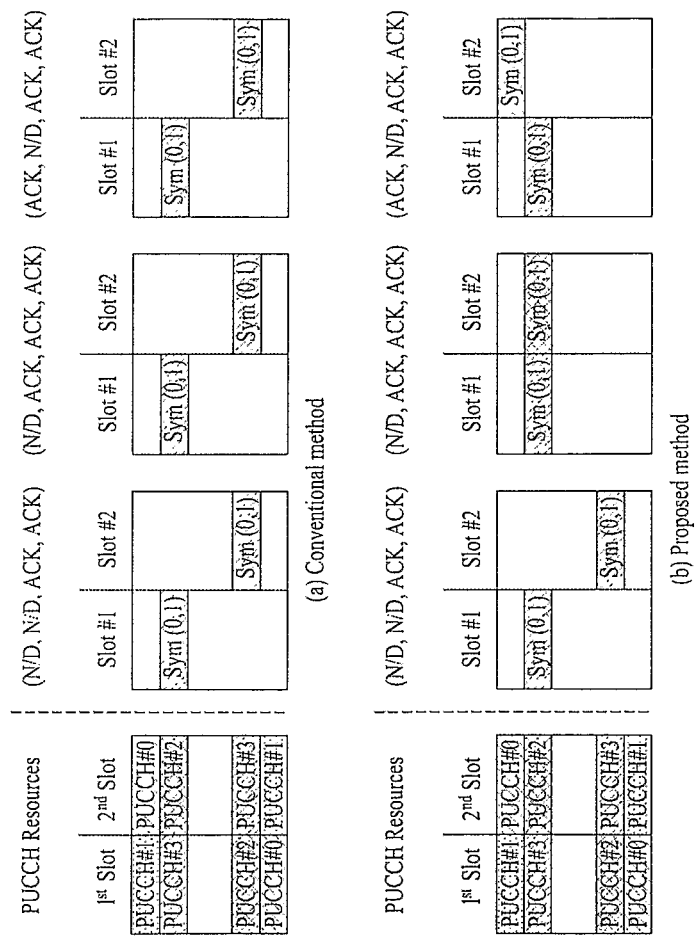

FIG. 11A and FIG. 11B illustrate that multiplexed ACK/NACK signals are transmitted using a per-slot PUCCH selection transmission mode. In this embodiment, it is assumed that PUCCH resources are selected in a slot unit and modulation values are selected in a subframe unit.

Referring to FIG. 11A, in the per-subframe PUCCH selection transmission mode according to the related art, (ACK, ACK,N/D,N/D), (ACK,ACK,ACK,N/D) and (ACK,ACK,N/D,ACK) are mapped with the same PUCCH resource ($n^{(1)}_{PUCCH,1}$; PUCCH#1) and the same modulation value (QPSK Sym(1,0)). However, according to this embodiment, (ACK,ACK,ACK,N/D) can be transmitted through PUCCH#1 and QPSK symbol (1,0) in the first slot (Slot#1) and through PUCCH#2 and QPSK symbol (1,0) in the second slot (Slot#2). Similarly, (ACK,ACK,N/D,ACK) can be transmitted through PUCCH#1 and QPSK symbol (1,0) in the first slot (Slot#1) and through PUCCH#3 and QPSK symbol (1,0) in the second slot (Slot#2).

Referring to FIG. 11B, in the per-subframe PUCCH selection transmission mode according to the related art, (N/D,N/D,ACK,ACK), (N/D,ACK,ACK,ACK) and (ACK,N/D,ACK,ACK) are mapped with the same PUCCH resource ($n^{(1)}_{PUCCH,3}$; PUCCH#3) and the same modulation value (QPSK Sym(1,0)). However, according to this embodiment, (N/D,ACK,ACK,ACK) can be transmitted through PUCCH#3 and QPSK symbol (0,1) in the first slot (Slot#1) and through PUCCH#2 and QPSK symbol (0,1) in the second slot (Slot#2). Similarly, (ACK,N/D, ACK,ACK) can be transmitted through PUCCH#3 and QPSK symbol (0,1) in the first slot (Slot#1) and through PUCCH#0 and QPSK symbol (0,1) in the second slot (Slot#2).

Figure 12:
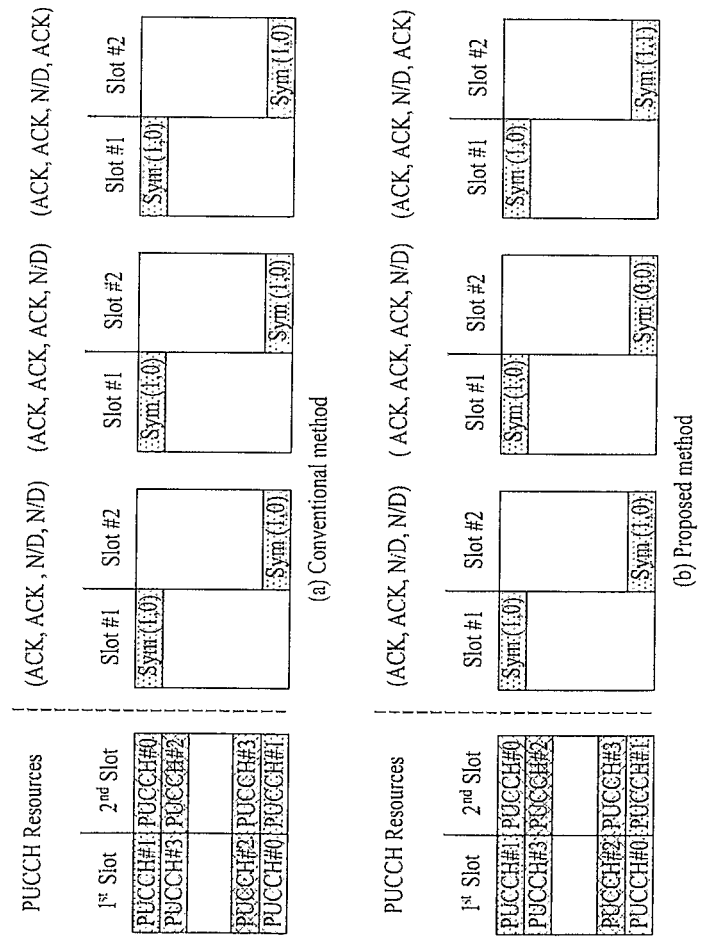

FIG. 12 illustrates another example that multiplexed ACK/NACK signals are transmitted using a per-slot PUCCH selection transmission mode. In this embodiment, it is assumed that PUCCH resources are selected in a subframe unit and modulation values are selected in a slot unit.

Referring to FIG. 12, in the per-subframe PUCCH selection transmission mode according to the related art, (ACK, ACK,N/D,N/D), (ACK,ACK,ACK,N/D) and (ACK,ACK,N/D,ACK) are mapped with the same PUCCH resource ($n^{(1)}_{PUCCH,1}$; PUCCH#1) and the same modulation value (QPSK Sym(1,0)). However, according to this embodiment, (ACK,ACK,ACK,N/D) can be transmitted through PUCCH#1 and QPSK symbol (1,0) in the first slot (Slot#1) and through PUCCH#1 and QPSK symbol (0,0) in the second slot (Slot#2). Similarly, (ACK,ACK,N/D,ACK) can be transmitted through PUCCH#1 and QPSK symbol (1,0) in the first slot (Slot#1) and through PUCCH#1 and QPSK symbol (1,1) in the second slot (Slot#2).

Figure 13A:
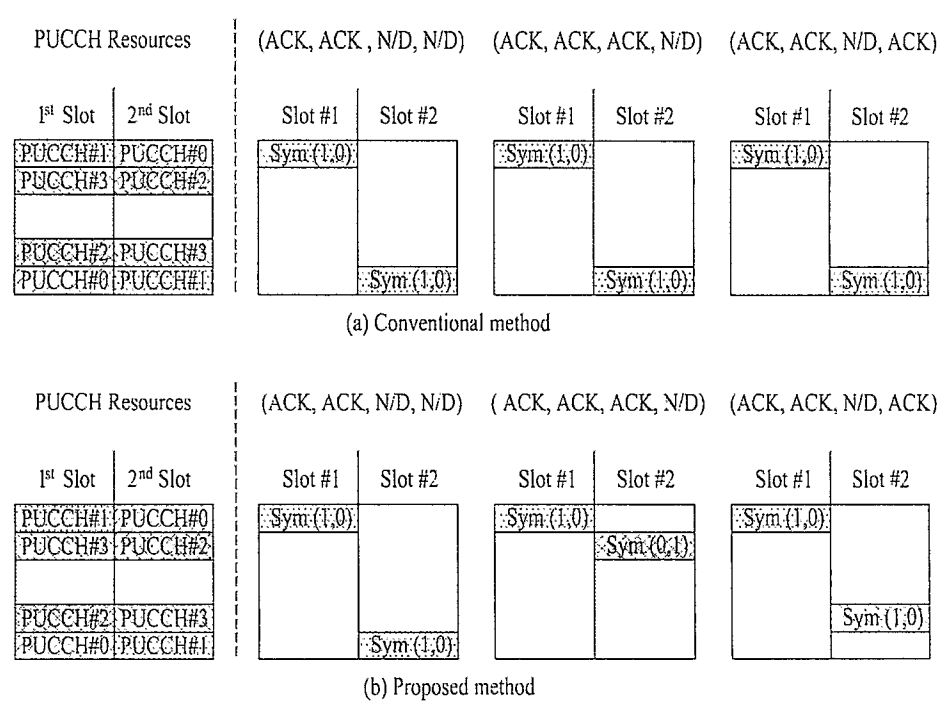

Referring to FIG. 13A, in the per-subframe PUCCH selection transmission mode according to the related art, (ACK, ACK,N/D,N/D), (ACK,ACK,ACK,N/D) and (ACK,ACK,N/D,ACK) are mapped with the same PUCCH resource ($n^{(1)}_{PUCCH,1}$; PUCCH#1) and the same modulation value (QPSK Sym(1,0)). However, according to this embodiment, (ACK,ACK,ACK,N/D) can be transmitted through PUCCH#1 and QPSK symbol (1,0) in the first slot (Slot#1) and through PUCCH#2 and QPSK symbol (0,1) in the second slot (Slot#2). Similarly, (ACK,ACK,N/D,ACK) can be transmitted through PUCCH#1 and QPSK symbol (1,0) in the first slot (Slot#1) and through PUCCH#3 and QPSK symbol (1,0) in the second slot (Slot#2).

Figure 13B:
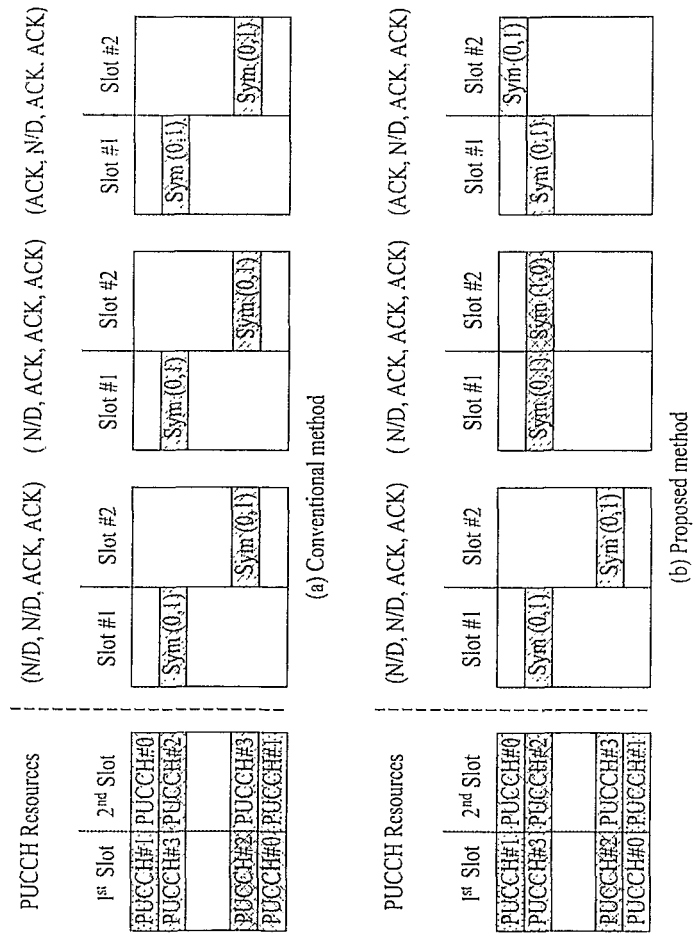

Referring to FIG. 13B, in the per-subframe PUCCH selection transmission mode according to the related art, (N/D,N/D,ACK,ACK), (N/D,ACK,ACK,ACK) and (ACK,N/D,ACK,ACK) are mapped with the same PUCCH resource ($n^{(1)}_{PUCCH,3}$; PUCCH#3) and the same modulation value (QPSK Sym(0,1)). However, according to this embodiment, (N/D,ACK,ACK,ACK) can be transmitted through PUCCH#3 and QPSK symbol (0,1) in the first slot (Slot#1) and through PUCCH#2 and QPSK symbol (1,0) in the second slot (Slot#2). Similarly, (ACK,N/D, ACK,ACK) can be transmitted through PUCCH#3 and QPSK symbol (0,1) in the first slot (Slot#1) and through PUCCH#0 and QPSK symbol (0,1) in the second slot (Slot#2).

Table 2 illustrates the per-slot PUCCH selection transmission mode illustrated in FIG. 13.

TABLE 2

| | Slot#1 | | Slot#2 | |
|---|---|---|---|---|
| ACK(0), ACK(1), ACK(2), ACK(3) | $n^{(1)}_{PUCCH}$ | b(0), b(1) | $n^{(1)}_{PUCCH}$ | b(0), b(1) |
| ACK, ACK, ACK, ACK | $n^{(1)}_{PUCCH,1}$ | 1, 1 | $n^{(1)}_{PUCCH,1}$ | 1, 1 |
| ACK, ACK, ACK, NACK/DTX | $n^{(1)}_{PUCCH,1}$ | 1, 0 | $n^{(1)}_{PUCCH,2}$ | 0, 1 |
| NACK/DTX, NACK/DTX, NACK, DTX | $n^{(1)}_{PUCCH,2}$ | 1, 1 | $n^{(1)}_{PUCCH,2}$ | 1, 1 |
| ACK, ACK, NACK/DTX, ACK | $n^{(1)}_{PUCCH,1}$ | 1, 0 | $n^{(1)}_{PUCCH,3}$ | 1, 0 |
| NACK, DTX, DTX, DTX | $n^{(1)}_{PUCCH,0}$ | 1, 0 | $n^{(1)}_{PUCCH,0}$ | 1, 0 |
| ACK, ACK, NACK/DTX, NACK/DTX | $n^{(1)}_{PUCCH,1}$ | 1, 0 | $n^{(1)}_{PUCCH,1}$ | 1, 0 |
| ACK, NACK/DTX, ACK, ACK | $n^{(1)}_{PUCCH,3}$ | 0, 1 | $n^{(1)}_{PUCCH,0}$ | 0, 1 |
| NACK/DTX, NACK/DTX, NACK/DTX, NACK | $n^{(1)}_{PUCCH,3}$ | 1, 1 | $n^{(1)}_{PUCCH,3}$ | 1, 1 |
| ACK, NACK/DTX, ACK, NACK/DTX | $n^{(1)}_{PUCCH,2}$ | 0, 1 | $n^{(1)}_{PUCCH,2}$ | 0, 1 |
| ACK, NACK/DTX, NACK/DTX, ACK | $n^{(1)}_{PUCCH,0}$ | 0, 1 | $n^{(1)}_{PUCCH,0}$ | 0, 1 |
| ACK, NACK/DTX, NACK/DTX, NACK/DTX | $n^{(1)}_{PUCCH,0}$ | 1, 1 | $n^{(1)}_{PUCCH,0}$ | 1, 1 |
| NACK/DTX, ACK, ACK, ACK | $n^{(1)}_{PUCCH,3}$ | 0, 1 | $n^{(1)}_{PUCCH,2}$ | 1, 0 |
| NACK/DTX, NACK, DTX, DTX | $n^{(1)}_{PUCCH,1}$ | 0, 0 | $n^{(1)}_{PUCCH,1}$ | 0, 0 |
| NACK/DTX, ACK, ACK, NACK/DTX | $n^{(1)}_{PUCCH,2}$ | 1, 0 | $n^{(1)}_{PUCCH,2}$ | 1, 0 |
| NACK/DTX, ACK, NACK/DTX, ACK | $n^{(1)}_{PUCCH,3}$ | 1, 0 | $n^{(1)}_{PUCCH,3}$ | 1, 0 |
| NACK/DTX, ACK, NACK/DTX, NACK/DTX | $n^{(1)}_{PUCCH,1}$ | 0, 1 | $n^{(1)}_{PUCCH,1}$ | 0, 1 |
| NACK/DTX, NACK/DTX, ACK, ACK | $n^{(1)}_{PUCCH,3}$ | 0, 1 | $n^{(1)}_{PUCCH,3}$ | 0, 1 |
| NACK/DTX, NACK/DTX, ACK, NACK/DTX | $n^{(1)}_{PUCCH,2}$ | 0, 0 | $n^{(1)}_{PUCCH,2}$ | 0, 0 |
| NACK/DTX, NACK/DTX, NACK/DTX, ACK | $n^{(1)}_{PUCCH,3}$ | 0, 0 | $n^{(1)}_{PUCCH,3}$ | 0, 0 |
| DTX, DTX, DTX, DTX | N/A | N/A | N/A | N/A |

FIG. 13A and FIG. 13B illustrate other example that multiplexed ACK/NACK signals are transmitted using a per-slot PUCCH selection transmission mode. In this embodiment, it is assumed that PUCCH resources are selected in a slot unit and modulation values are selected in a slot unit. Preferably, in the per-slot PUCCH selection transmission mode, combination of PUCCH resource and modulation value of each slot is selected so as not to collide with another ACK/NACK hypothesis where the same combination is used for the corresponding slot. In this embodiment, combination of PUCCH resource and modulation value of each slot is selected using gray coding.

In Table 2, ACK(i) represents HARQ ACK/NACK result of the i-th data unit ($0 \le i \le 3$). DTX (Discontinuous Transmission) represents that transmission of a data unit corresponding to ACK(i) is not performed or the user equipment fails to detect a data unit corresponding to HARQ-ACK(i). If a plurality of data units are received at the same time (for, example, same subframe), the order of the data units can be identified using a sequence value signaled through PDCCH. Also, if the data units are received at different times (for example, different subframes), the order of the data units can be identified using a subframe number.

Figure 14:
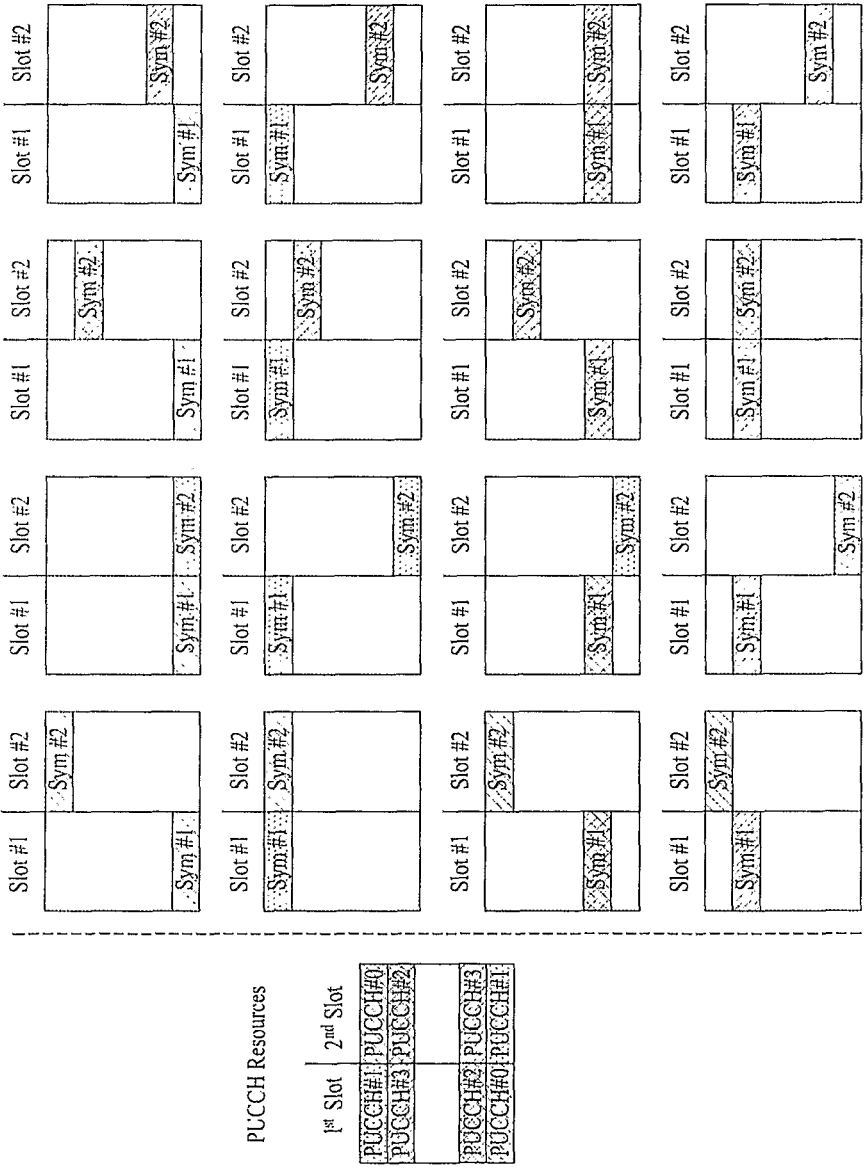
FIG. 14 is a diagram illustrating combination of modulation values and PUCCH resources for transmitting ACK/NACK signals when per-slot PUCCH transmission is performed in accordance with one embodiment of the present invention.

FIG. 14 is a diagram illustrating combination of available PUCCH resources and modulation values when per-slot PUCCH transmission is performed in accordance with one embodiment of the present invention. In this embodiment, transmission of four ACK/NACK signals is performed but this is only exemplary.

Referring to FIG. 14, combination of PUCCH resources, slot location, and modulation value is considered to transmit multiplexed ACK/NACK signals. If two slots are provided, the number of possible maximum combinations of PUCCH resource and slot location is 16 (possible PUCCH resources for the first slot×possible PUCCH resources for the second slot=$_4C_1 \times _4C_1$). If the ACK/NACK result of the data unit is DTX or NACK/DTX, since no PUCCH resource of the corresponding data unit is considered, possible combinations may be varied depending on the ACK/NACK result. If QPSK modulation is considered for ACK/NACK signal, the number of combinations (S #1, S #2) of modulation values that can be used for the PUCCH resources selected in a slot unit is 16 (possible QPSK symbols for the first slot×possible QPSK symbols for the second slot=$_4C_1 \times _4C_1$). Consequently, if transmission of four ACK/NACK signals is performed and QPSK modulation is used, the per-slot PUCCH selection transmission mode can support a total of 256 ACK/NACK hypotheses. If transmission of four ACK/NACK signals is considered, since the number of a total of ACK/NACK hypotheses is 81 ($3^4$), the per-slot PUCCH selection transmission mode can effectively support ACK/NACK transmission. If ACK/NACK hypothesis is mapped with combination of radio resource/modulation value, it is preferable that the combination of radio resource/modulation value is selected to minimize ACK/NACK error. For example, the combination of radio resource/modulation value can be selected using gray coding.

Figure 15:
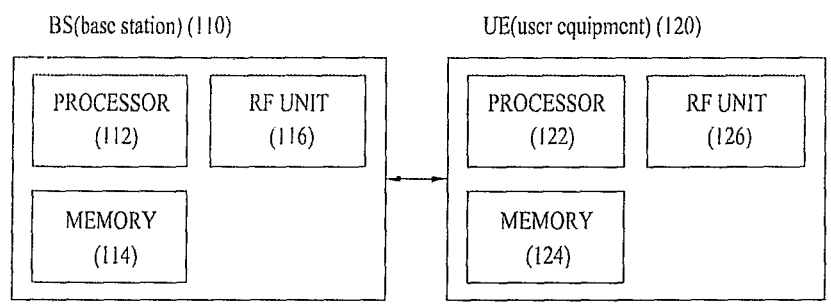
FIG. 15 is a diagram illustrating a base station and a user equipment that can be applied to one embodiment of the present invention.

FIG. 15 is a diagram illustrating a base station and a user equipment that can be applied to one embodiment of the present invention.

Referring to FIG. 15, the wireless communication system includes a base station (BS) 110 and a user equipment (UE) 120. In the downlink, the transmitter is a part of the base station 110 and the receiver is a part of the user equipment 120. In the uplink, the transmitter is a part of the user equipment 120 and the receiver is a part of the base station 110. The base station 110 includes a processor 112, a memory 114, and a radio frequency (RF) unit 116. The processor 112 can be configured to implement procedures and/or methods suggested in the present invention. The memory 114 is connected with the processor 112 and stores various kinds of information related to the operation of the processor 112. The RF unit 116 is connected with the processor 112 and transmits and/or receives a radio signal. The user equipment 120 includes a processor 122, a memory 124, and a radio frequency (RF) unit 126. The processor 122 can be configured to implement procedures and/or methods suggested in the present invention. The memory 124 is connected with the processor 122 and stores various kinds of information related to the operation of the processor 122. The RF unit 126 is connected with the processor 122 and transmits and/or receives a radio signal. The base station 110 and/or the user equipment 120 can have a single antenna or multiple antennas.

The aforementioned embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

The embodiments of the present invention have been described based on the data transmission and reception between the base station and the user equipment. A specific operation which has been described as being performed by the base station may be performed by an upper node of the base station as the case may be. In other words, it will be apparent that various operations performed for communication with the user equipment in the network which includes a plurality of network nodes along with the base station can be performed by the base station or network nodes other than the base station. The base station may be replaced with terms such as a fixed station, Node B, eNode B (eNB), and access point. Also, the user equipment may be replaced with terms such as mobile station (MS) and mobile subscriber station (MSS).

The embodiments according to the present invention can be implemented by various means, for example, hardware, firmware, software, or their combination. If the embodiment according to the present invention is implemented by hardware, the embodiment of the present invention can be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiment according to the present invention is implemented by firmware or software, the embodiment of the present invention may be implemented by a type of a module, a procedure, or a function, which performs functions or operations described as above. A software code may be stored in a memory unit and then may be driven by a processor. The memory unit may be located inside or outside the processor to transmit and receive data to and from the processor through various means which are well known.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

INDUSTRIAL APPLICABILITY

The present invention can be applied to a wireless communication system. More specifically, the present invention can be applied to a method and apparatus of slot based ACK/NACK transmission.

What is claimed is:

1. A method of transmitting acknowledgement (ACK)/negative-ACK (HACK) signals by a user equipment in a wireless communication system, the method comprising:

receiving a plurality of data units from a base station; and transmitting a plurality of ACK/NACK signals corresponding to the plurality of data units in a subframe comprising a first slot and a second slot,
wherein the plurality of ACK/NACK signals include a first ACK/NACK signal and a second ACK/NACK signal,
wherein when physical uplink control channel (PUCCH) resources for the first and second ACK/NACK signals are reserved, the first ACK/NACK signal is transmitted in only the first slot and the second ACK/NACK signal is transmitted in only the second slot,
wherein when a PUCCH resource for the first ACK/NACK signal is reserved and a PUCCH resource for the second ACK/NACK signal is not reserved due to a physical downlink control channel (PDCCH) decoding failure, the first ACK/NACK signal is transmitted in both the first and second slots, and
wherein each of the first and second slots is a 0.5 millisecond time interval.

2. The method of claim 1, wherein the plurality of data units are received at the same time via one or more downlink component carriers.

3. The method of claim 1, wherein PUCCH resources for transmission of the plurality of ACK/NACK signals are different from one another in each of the first and second slots.

4. The method of claim 1, wherein the plurality of data units are received in a plurality of subframes via one downlink component carrier.

5. The method of claim 1, wherein when there are more data units among the plurality of data units than ACK/NACK signals among the plurality of ACK/NACK signals, the first or second ACK/NACK signal indicates ACK/NACK information for two or more data units.

6. The method of claim 5, wherein the first or second ACK/NACK signal is represented by one modulation symbol.

7. The method of claim 6, wherein the one modulation symbol is generated using quadrature phase shift keying (QPSK) or quadrature amplitude modulation (QAM).

8. The method of claim 1, wherein a PUCCH resource includes a time-frequency resource, a cyclic shift for frequency spreading, and an orthogonal code for time spreading.

9. A user equipment of a wireless communication system, the user equipment comprising:
a radio frequency (RF) unit;
a memory; and
a processor operatively connected to the RF unit and the memory and configured to:
receive a plurality of data units from a base station through the RF unit, and
transmit a plurality of acknowledgement (ACK)/negative-ACK (HACK) signals corresponding to the plurality of data units in a subframe comprising a first slot and a second slot through the RF unit,
wherein the plurality of ACK/NACK signals include a first ACK/NACK signal and a second ACK/NACK signal,
wherein when physical uplink control channel (PUCCH) resources for the first and second ACK/NACK signals are reserved, the first ACK/NACK signal is transmitted in only the first slot and the second ACK/NACK signal is transmitted in only the second slot,
wherein when a PUCCH resource for the first ACK/NACK signal is reserved and a PUCCH resource for the second ACK/NACK signal is not reserved due to a physical downlink control channel (PDCCH) decoding failure, the first ACK/NACK signal is transmitted in both the first and second slots, and
wherein each of the first and second slots is a 0.5 millisecond time interval.

10. The user equipment of claim 9, wherein the plurality of data units are received at the same time via one or more downlink component carriers.

11. The user equipment of claim 9, wherein PUCCH resources for transmission of the plurality of ACK/NACK signals are different from one another in each of the first and second slots.

12. The user equipment of claim 9, wherein the plurality of data units are received in a plurality of subframes via one downlink component carrier.

13. The user equipment of claim 9, wherein when there are more data units among the plurality of data units than ACK/NACK signals among the plurality of ACK/NACK signals, the first or second ACK/NACK signal indicates ACK/NACK information for two or more data units.

14. The user equipment of claim 13, wherein the first or second ACK/NACK signal is represented by one modulation symbol.

15. The user equipment of claim 14, wherein the one modulation symbol is generated using quadrature phase shift keying (QPSK) or quadrature amplitude modulation (QAM).

16. The user equipment of claim 9, wherein a PUCCH resource includes a time-frequency resource, a cyclic shift for frequency spreading, and an orthogonal code for time spreading.

* * * * *